United States Patent
Duong

(10) Patent No.: US 6,513,023 B1
(45) Date of Patent: Jan. 28, 2003

(54) ARTIFICIAL NEURAL NETWORK WITH HARDWARE TRAINING AND HARDWARE REFRESH

(75) Inventor: Tuan A. Duong, Glendora, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/412,199

(22) Filed: Oct. 1, 1999

(51) Int. Cl.[7] ................................................ G06N 3/02
(52) U.S. Cl. ........................... 706/26; 706/34; 706/39; 706/40; 708/801
(58) Field of Search ............................. 706/26, 34, 39, 706/40; 708/801

(56) References Cited

U.S. PATENT DOCUMENTS

| | | | |
|---|---|---|---|
| 4,866,645 A | 9/1989 | Lish | 364/602 |
| 4,912,652 A | 3/1990 | Wood | 364/513 |
| 4,951,239 A | 8/1990 | Andes et al. | 364/807 |
| 5,039,870 A | * 8/1991 | Engeler | 708/801 |
| 5,039,871 A | * 8/1991 | Engeler | 708/801 |
| 5,093,899 A | 3/1992 | Hiraiwa | 395/23 |
| 5,113,483 A | 5/1992 | Keeler et al. | 395/23 |
| 5,130,563 A | * 7/1992 | Nabet et al. | 706/40 |
| 5,136,176 A | 8/1992 | Castro | 307/201 |
| 5,146,542 A | * 9/1992 | Engeler | 706/34 |
| 5,150,450 A | 9/1992 | Swenson et al. | 395/23 |
| 5,155,802 A | * 10/1992 | Mueller et al. | 706/39 |
| 5,159,660 A | 10/1992 | Lu et al. | 395/22 |
| 5,179,596 A | 1/1993 | Weingard | 382/15 |
| 5,182,794 A | 1/1993 | Gasperi et al. | 395/23 |
| 5,187,680 A | * 2/1993 | Engeler | 708/801 |

(List continued on next page.)

OTHER PUBLICATIONS

Duong, Tuan A., "Cascade Error Protection: An Efficient Hardware Learning Algorithm," *IEEE/ICNN'95*, Perth, Western Australia, 1995, pp. 1–6.

Duong, Tuan A. and Daud, Taher, "Cascade Error Protection–A Learning Algorithm for Hardwave Implementation," *IWANN'99*, Alicante, Spain, Jun. 2–4, 1999, pp. 1–9.

Duong, Tuan A., Kemeny, Sabrina, Daud, Taher, Thakoor, Anil, Sanders, Chris and Carson, John, "Analog 3–D Neuroprocessor for Fast Frame Focal Plane Image Processing," The Industrial Electronics Handbook, *CCR Press; IEEE Press*, 1997, pp. 989–1002.

*Primary Examiner*—Wilbert L. Starks, Jr.

(57) ABSTRACT

A neural network circuit is provided having a plurality of circuits capable of charge storage. Also provided is a plurality of circuits each coupled to at least one of the plurality of charge storage circuits and constructed to generate an output in accordance with a neuron transfer function. Each of a plurality of circuits is coupled to one of the plurality of neuron transfer function circuits and constructed to generate a derivative of the output. A weight update circuit updates the charge storage circuits based upon output from the plurality of transfer function circuits and output from the plurality of derivative circuits. In preferred embodiments, separate training and validation networks share the same set of charge storage circuits and may operate concurrently. The validation network has a separate transfer function circuits each being coupled to the charge storage circuits so as to replicate the training network's coupling of the plurality of charge storage to the plurality of transfer function circuits. The plurality of transfer function circuits may be constructed each having a transconductance amplifier providing differential currents combined to provide an output in accordance with a transfer function. The derivative circuits may have a circuit constructed to generate a biased differential currents combined so as to provide the derivative of the transfer function.

32 Claims, 5 Drawing Sheets

U.S. PATENT DOCUMENTS

| | | | |
|---|---|---|---|
| 5,256,911 A | 10/1993 | Holler et al. | 307/201 |
| 5,264,734 A | 11/1993 | Holler et al. | 307/201 |
| 5,280,564 A | 1/1994 | Shiomi et al. | 395/23 |
| 5,313,559 A | 5/1994 | Ogata et al. | 395/23 |
| 5,333,239 A | 7/1994 | Watanabe et al. | 395/23 |
| 5,343,555 A | 8/1994 | Yayla et al. | 395/24 |
| 5,347,613 A | 9/1994 | Chung et al. | 395/24 |
| 5,408,588 A | 4/1995 | Ulug | 395/23 |
| 5,479,571 A | 12/1995 | Parlos et al. | 395/21 |
| 5,625,751 A | 4/1997 | Brandwajn et al. | 395/22 |
| 5,625,752 A | 4/1997 | Swenson | 395/24 |
| 5,648,926 A | 7/1997 | Douglas et al. | 364/807 |
| 5,781,702 A | 7/1998 | Alhalabi | 395/24 |
| 5,857,178 A | 1/1999 | Kimura et al. | 706/41 |

* cited by examiner

ARTIFICIAL NEURAL NETWORK WITH HARDWARE TRAINING AND HARDWARE REFRESH

ORIGIN OF THE INVENTION

The invention described herein was made -in the performance of work under a NASA contract, and is subject to the provisions of Public Law 96-517 (35 USC 202) in which the contractor has elected not to retain title.

BACKGROUND

Neural networks offer a computing paradigm that allows a nonlinear input/output relationship or transformation to be established based primarily on given examples of the relationship rather than a formal analytical knowledge of its transfer function. This paradigm provides for a training of the network during which the weight values of the synaptic connections from one layer of neurons to another are changed in an iterative manner to successively reduce error between actual and target outputs.

Typically, for neural networks to establish the transformation paradigm, input data generally is divided into three parts. Two of the parts, called training and cross-validation, must be such that the corresponding input-output pairs (ground truth) are known. During training, the cross-validation set allows verification of the status of the transformation relationship learned by the network to ensure adequate learning has occurred and to avoid over-learning. The third part, termed the validation data, which may or may not include the training and/or the cross-validation data set, is the data transformed into output.

Neural networks may be formed with software, hardware, or hybrid implementations for training connectionist models. One drawback with software techniques is that, because computers execute programmed instructions sequentially, the iterative process can be inconveniently slow and require vast amounts of computing resources to process the large number of connections necessary for most neural network applications. As such, software techniques are not feasible for most applications, and in particular, where computing resources are limited and large amounts of information must be processed.

In one approach for analog implementation of a synapse, the weight is stored as a charge on a capacitor. A problem with representing a weight as a stored charge is that charge leakage changes the weight of the connection. Although there are several approaches to eliminate charge leakage, such as reducing the capacitor's thermal temperature, or increasing its capacitance, they are not practical for most applications. As an alternative, an electrically erasable programmable read only memory or EEPROM may be used. Although this eliminates the charge leakage problem, such a device is too slow for high speed learning networks.

Hybrid systems on the other hand, are able to overcome the problem of charge leakage associated with capacitively stored weights by controlling training and refresh training digitally. In a typical hybrid system, the capacitively stored weight is digitized and monitored with digital circuitry to determine whether more training or whether refresh training is necessary. When necessary, the weight of the neuron is refreshed using the digitally stored target weight.

A significant drawback with hybrid training and refresh approaches is that it is not practical for very large scale neural networks, which are necessary for most applications. This is because A/D and D/A converters must be used for weight quantization. For most training techniques, such as Error Back Propagation, weight quantization of each synaptic link requires at least 12 bit precision, or more, to provide sufficient resolution for simple problems. Such resolution is impractical for most implementations due to expense and size concerns. As such, either the resolution or the processing capability of the neural network usually is sacrificed. Thus, providing such resolution for each neuron of a massive neural network makes this approach impractical for typical applications.

SUMMARY OF THE PREFERRED EMBODIMENTS

In an embodiment of the present invention, a neural network circuit is provided having a plurality of circuits capable of charge storage. Also provided is a plurality of circuits each coupled to at least one of the plurality of charge storage circuits and constructed to generate an output in accordance with a neuron transfer function, along with a plurality of circuits, each coupled to one of the plurality of neuron transfer function circuits and constructed to generate a derivative of the output. A weight update circuit updates the charge storage circuits based upon output from the plurality of transfer function circuits and output from the plurality of derivative circuits.

In preferred embodiments, a training network and a validation network share the same set of charge storage circuits and may operate concurrently. The training network has a plurality of circuits capable of charge storage and a plurality of transfer function circuits each being coupled to at least one of the charge storage circuits. In addition, the training network has a plurality of derivative circuits each being coupled to one of the plurality of transfer function circuits and constructed to generate a derivative of an output of the one transfer function circuit. The validation network has a plurality of transfer function circuits each being coupled to the plurality of charge storage circuits so as to replicate the training network's coupling of the plurality of charge storage to the plurality of transfer function circuits.

Embodiments of each of the plurality of transfer function circuits may be constructed having a transconductance amplifier. The transconductance amplifier is constructed to provide differential currents $I_1$ and $I_2$ from an input current $I_{in}$ and to combine the differential currents to provide an output in accordance with a transfer function. In such embodiments each of the plurality of derivative circuits may have a circuit constructed to generate a biased $I_1$ and a biased $I_2$, combine the biased $I_1$ and biased $I_2$, and provide an output in accordance with the derivative of the transfer function. In a preferred embodiment, in order to provide the derivative of the transfer function from the biasing and combining circuits and the transconductance amplifier outputs, each of the plurality of derivative circuits has a subtraction circuit.

A preferred method of the present invention is performed by creating a plurality of synaptic weights by storing charge on a plurality of capacitive circuits and generating a plurality of neuron outputs in accordance with a transfer function. The outputs are generated from the plurality of weights using a plurality of transfer function circuits. The derivative of each of the plurality of neuron outputs is generated using a plurality of derivative circuits each coupled to one of the plurality of transfer function circuits. A neural network is trained using a plurality of delta weights which are generated using the plurality of transfer function derivatives.

Furthermore, in a preferred method, a plurality of synaptic weights are established by storing charge on a plurality of capacitive circuits using a training network having a plurality of neurons each capable of providing outputs in accordance with a transfer function. The plurality of weights are shared with a validating network having a second plurality of neurons each capable of providing outputs in accordance with the transfer function. With this method cross-validation testing or validation testing may be performed using the validation network. Also with this method, training the neural network and performing the at least one of cross-validation testing or the validating testing may be performed simultaneously.

Such an approach eliminates the need for digital refresh circuitry and allows the advantages of speed, simplicity, and accuracy provided by analog storage to be exploited.

DETAILED DESCRIPTION OF THE PREFERRED EMBODIMENTS AND METHODS OF THE PRESENT INVENTION

Preferred embodiments of the present invention provide on-chip learning using an analog approach to capacitor training and refresh training. Such an approach eliminates the need for digital refresh circuitry and allows the advantages of speed, simplicity, and accuracy provided by analog storage to be exploited. Further, preferred embodiments incorporating the on-chip learning allow hardware implementation of training, cross-validation, and validation functions.

Figure 1:
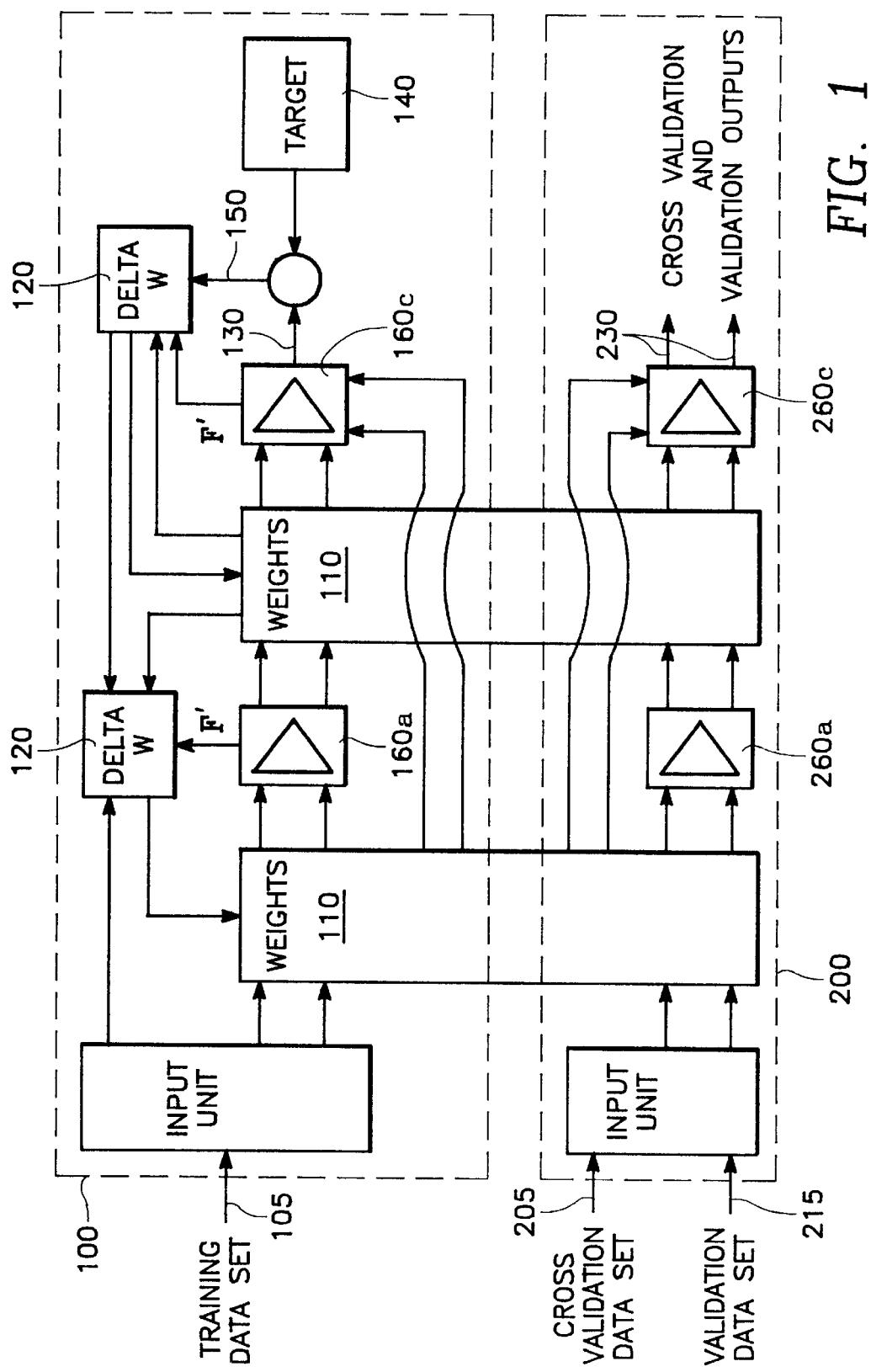
FIG. 1 is a functional block diagram of a preferred embodiment in accordance with the present invention.

Turning to FIG. 1, in a preferred embodiment of the present invention a neural network is provided having two similar networks, one for training 100, and one for validation 200. With this embodiment, two distinct networks, training 100 and validation 200, share the same weights 110 between them. In this embodiment, the interconnection of weights 110 and neurons 160 of the training network 100 is replicated in the validation network 200 by sharing weights 110 and using neurons 260. Thus, in a preferred embodiment, the interconnection of weights 110 and neurons 160 is mirrored in the validation network 200.

In general, training involves summing the weights 110 of a layer, applying the summed weights 110 to a transfer function 160, providing the transfer function output either to a next layer as a weighted connection, or providing it for comparison with target data 140 to produce an error signal ε at 150 used to train the network 100.

During training iterations, the weight values 110 are continuously modulated using an error back propagation type technique. Such a technique uses a means to generate delta weights 120 using an algorithm to determine the delta weight values necessary to train each of the weights 110. The delta weight means 120 uses the error signal 150 along with the derivative F' of the output of each neuron transfer function 160 to train each of the weights 110, or to train new hidden weights, not shown. The weights are updated based on the delta weight algorithm using a weight update circuit as is known in the art.

The validating network 200 performs cross-validating and validation testing. The validating network 200 performs cross-validating using a cross-validation data set 205 while the training network 100 is being trained using a training set 105. Cross-validating controls learning and freezing the learning rate of the training network 100 based on a predetermine threshold value to preventing over learning.

After learning is complete, the validating network 200 is used for validation testing of a validation or test data set 215, while refresh training of the previously learned weights occurs through the training network 100. Refresh training begins if the weights fall below a predetermined threshold of their trained values. As such, the weights are refreshed trained without having to use the original training data set 105. As a result of the separate training and validating networks 100 and 200, test set validation testing may occur concurrently with refresh training.

Thus, in implementation, one of the circuits is the learning network 100 which is computing the delta weights and updating them in real time. This network 100 learns the new and incomplete training patterns, and also enhances and recovers the weights which can be degraded by charge leakage or the failure of some components. Another circuit is, in parallel, the validating network 200 which is working simultaneously either to cross-validate or to validate data sets 205 or 215. Since two networks 100 and 200 are sharing the same weight set in parallel, the differences between the two networks 100 and 200 comprise multipliers (not shown), hidden neurons 160a and 260a, and output neurons 160c and 260c.

With the validating network 200 in parallel, the over learning state can be detected by validating the cross-validation data set 205 without interrupting the learning process. In addition, the speed of learning is not slowed down whether it is learning new weights in a new hidden unit, or learning all the new and old weights in new and old hidden units simultaneously. Because the speed of learning does not have an effect in the weight space, the method and circuit of preferred embodiment of the present invention provides learning new and old weight components simultaneously. Therefore, potentially, the learning network 100 is able to obtain the optimal trajectory since it can learn whole weight space repeatedly.

Figure 2:
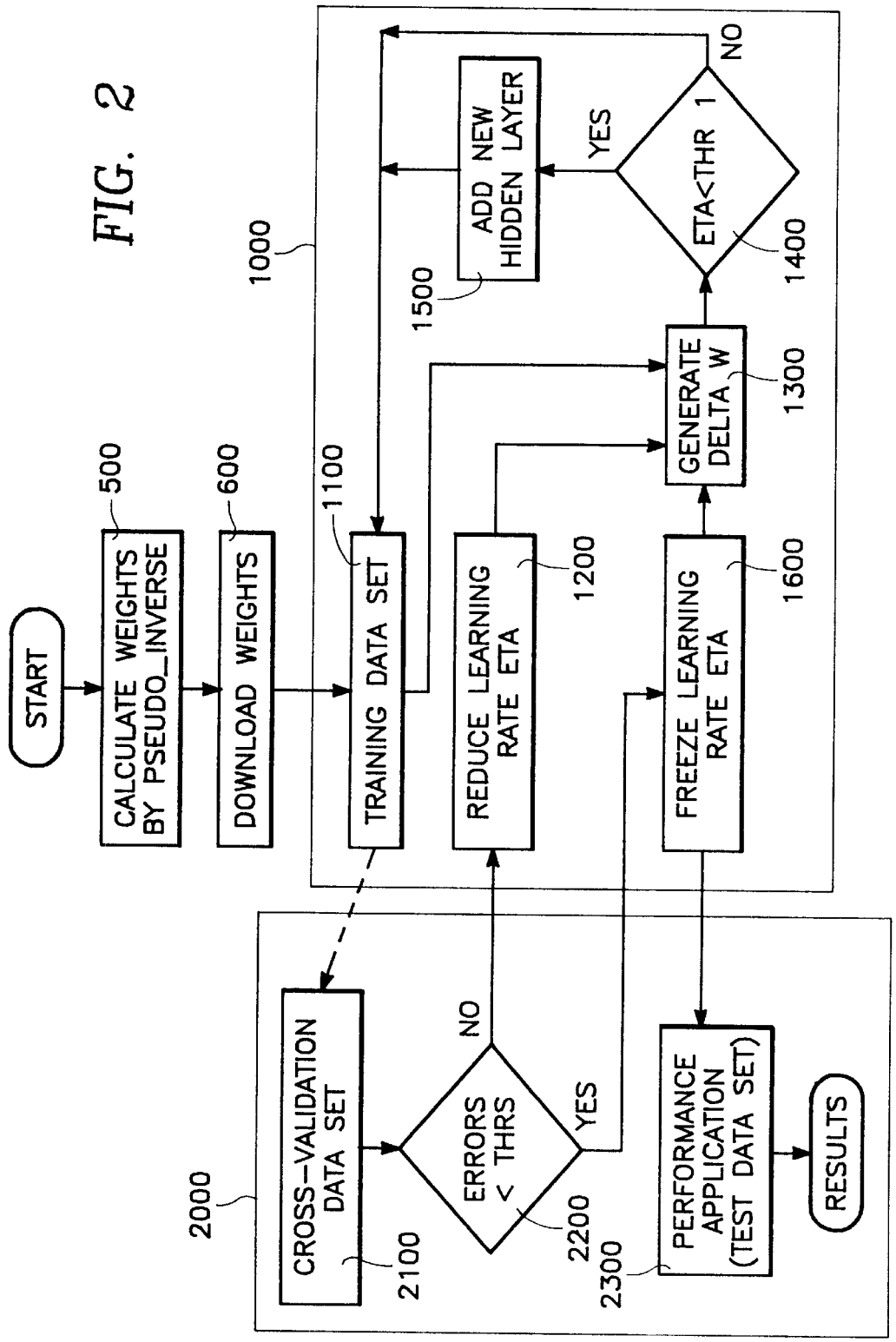
FIG. 2 is a flow diagram of a preferred method in accordance with the present invention.

FIG. 2 illustrates a functional flow of training, cross-validating, and test set validating. With this method, weight values are calculated by a pseudo-inverse technique 500 and downloaded 600. A training data set 1100 is input to the training network 1000. The training data set 1100 may also be supplied to the validation network 2000 as the cross-validation data set 2100 of the validation network 2000. The output of the cross-validation data set 2100 is compared to a target data set to provide cross-validation error signals. The cross-validation error signals are compared to a threshold value in block 2200 to determine the learning state of the training network 1000. If the cross-validation error is less than the threshold level the learning rate eta is frozen 1600 to prevent over learning. After the learning rate eta is frozen, test set validation 2300 may be performed. If the cross-validation errors are not less than the threshold, the learning rate eta is reduced 1200 using the training data set 1100.

After the learning rate is either reduced 1200 or frozen 1600, delta weights are generated 1300. To determine whether a new hidden layer is necessary, the learning rate eta is compared to a threshold value 1400. If the comparison 1400 indicates that eta is greater than the threshold, no new hidden layer of neurons is necessary so the delta weights are applied to existing weights of the training data set 1100. If the comparison 1400 indicates that eta is less than the threshold, a new hidden layer of neurons is added 1500 and the delta weights are applied to the newly formed hidden layer.

Figure 3:
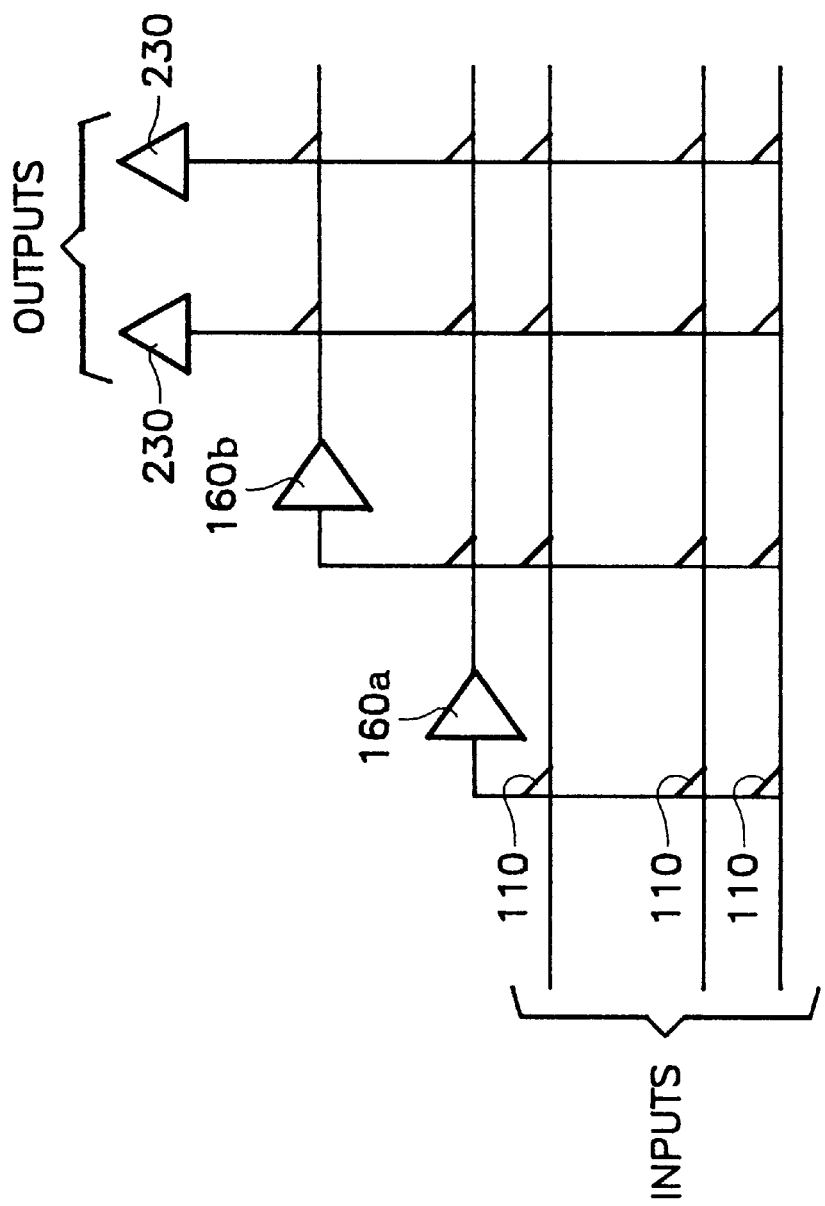
FIG. 3 illustrates weights and neuron coupling in accordance with a preferred embodiment of the present invention.

Turning to FIG. 3, the training network 100 of FIG. 1 may have a Cascade Back Propagation architecture, such as is known in the art and disclosed in *Analog 3-D Neuroprocessor for Fast Frame Focal Plane Image Processing,* by Duong et al., printed in The Industrail Electronics Handbook, pp. 990–1002, CRC Press, Boca Raton, Fla., 1996, Library of Congress Card Number 96-3070, herein incorporated by reference in its entirety.

The Cascade Back Propagation is a gradient descent technique of supervised learning which combines the good features of Back Propagation and Cascade Correlation. One advantage of such an approach is that a cascade type architecture is more suitable for hardware learning implementations because it does not require fixing the number of hidden connections before learning begins. This type learning architecture allows sequential addition of a new hidden neuron 160b to a previously formed hidden neuron 160a if based on the level of learning rate. In hardware implementation, a threshold level is used to add a new hidden neuron 160b when the learning rate falls below the threshold level as discussed above. As such, combining these techniques allows a mathematical model for Back Propagation which uses a well studied gradient descent for learning and avoids fixing, a priori, the number of neurons in the hidden layer.

In this method, the weights 110 between the input layer and the output layer 230 are first calculated by using a pseudo-inverse technique. Thus, the network is assigned the best set of weights that represents the best fitting hyperplane in quadratic energy form between input layer and output layer for the output energy surface. In some cases, the best fitting hyperplane may not be good enough. This is true especially when the solution is not linearly separable. Based upon this output surface then, the network is designed to add a new hidden neuron to learn on the error surface. The learning occurs continuously as long as the learning rate is still above a threshold level. Otherwise, a new hidden neuron is added. When the learning energy reaches a value based on a predetermined criteria, the learning rate is frozen. Then, without changing the learning rate, the learning network keeps learning endlessly in the existing loop.

Furthermore, the newly added hidden neuron not only has weighted connections to it from all the inputs, but also establishes a new dimension of inputs which is formed from the previous hidden neurons. With this technique of adding new dimension, the network has a chance to get out of a local minimum when it is in one. In addition, when the learned network permutes the order of hidden units of Back Propagation architecture, the network is unchanged in energy level. With this attribute, it is known that there are many identical subspaces which exist in the same network of Back Propagation. Nevertheless, the same permutation technique is not applicable to Cascade Back Propagation architecture because the hidden units are set orderly in series for the cascading technique. Therefore, there exists only one subspace, a cone of hypercube, which is used to learn the transformation. Instead of working in several identical subspaces or cones at the same time by Back Propagation architecture, Cascade Back Propagation learns only in one cone. Thus, it is expected to provide faster convergence.

In one implementation of the present invention, a Cascade Error Projection algorithm is used. Such an algorithm is known in the art and disclosed in *Cascade Error Projection_A Learning Algorithm For Hardware Implementation,* by T. A. Duong and T. Daud, presented to IWANN'99 in Alicante, Spain, Jun. 2–4, 1999, herein incorporated by reference in its entirety. With such an algorithm, the energy function is defined as:

$$E(n+1) = \sum_{p=1}^{P} \left\{ f_h^p(n+1) - \frac{1}{m}\sum_{o=1}^{m}(t_o^p - o_o^p) \right\}^2. \quad (1)$$

The weight updating between the inputs, including previously added hidden units, and the newly added hidden unit is calculated as follows:

$$\Delta w_{ih}^p(n+1) = -\eta \frac{\partial E(n+1)}{\partial w_{ih}^p(n+1)} \quad (2)$$

and the weight updating between hidden unit n+1 and the output unit o is $$w_{ho}(n+1) = \frac{\sum_{p=1}^{P} \varepsilon_o^p f_o'^p f_h^p(n+1)}{\sum_{p=1}^{P} [f_o'^p f_h^p(n+1)]^2} \quad (3)$$

where $$f(x) = \frac{1-e^{-x}}{1+e^{-x}},$$

m is the number of outputs,

P is the number of training patterns, $\eta$ is the learning rate eta, error $\varepsilon_o^p = t_o^p - o_o^p(n)$, $t_o^p$ is the target element for training pattern p, $o_o^p(n)$ is the output element o of actual output o(n) for training pattern p, n indicates the number of previously added hidden units, $f'_o{}^p(n) = f'_o{}^p$ denotes the output transfer function derivative with respect to its input, and $f_h^p(n+1)$ denotes the transfer function of hidden unit n+1.

With preferred algorithm above, and with other back propagation type techniques, the derivative of the neuron transfer function of each neuron, evaluated at the neuron output value, is required by the learning algorithm to generate the delta weight values used to train the network. Thus, it is desirable that embodiments of the present invention provide not only the neuron transfer function output, but also its derivative, in real time, with respect to a neuron input signal.

Thus, the preferred embodiment of the present invention provides a transconductance amplifier designed locally as a neuron to obtain a transfer function and its derivative with respect to an input signal. In general, to accomplish this, inputs x and Δx are supplied to the neuron, where x is the sum of the weights to the neuron and Δx is a small applied bias. From these inputs, the neuron generates values for f(x) and f(x+Δx) in accordance with the transfer function. The derivative is then generated according to:

$$f'(x)=\alpha*[f(x+\Delta x)-f(x)]$$

where α is a constant of proportionality.

Figure 4:
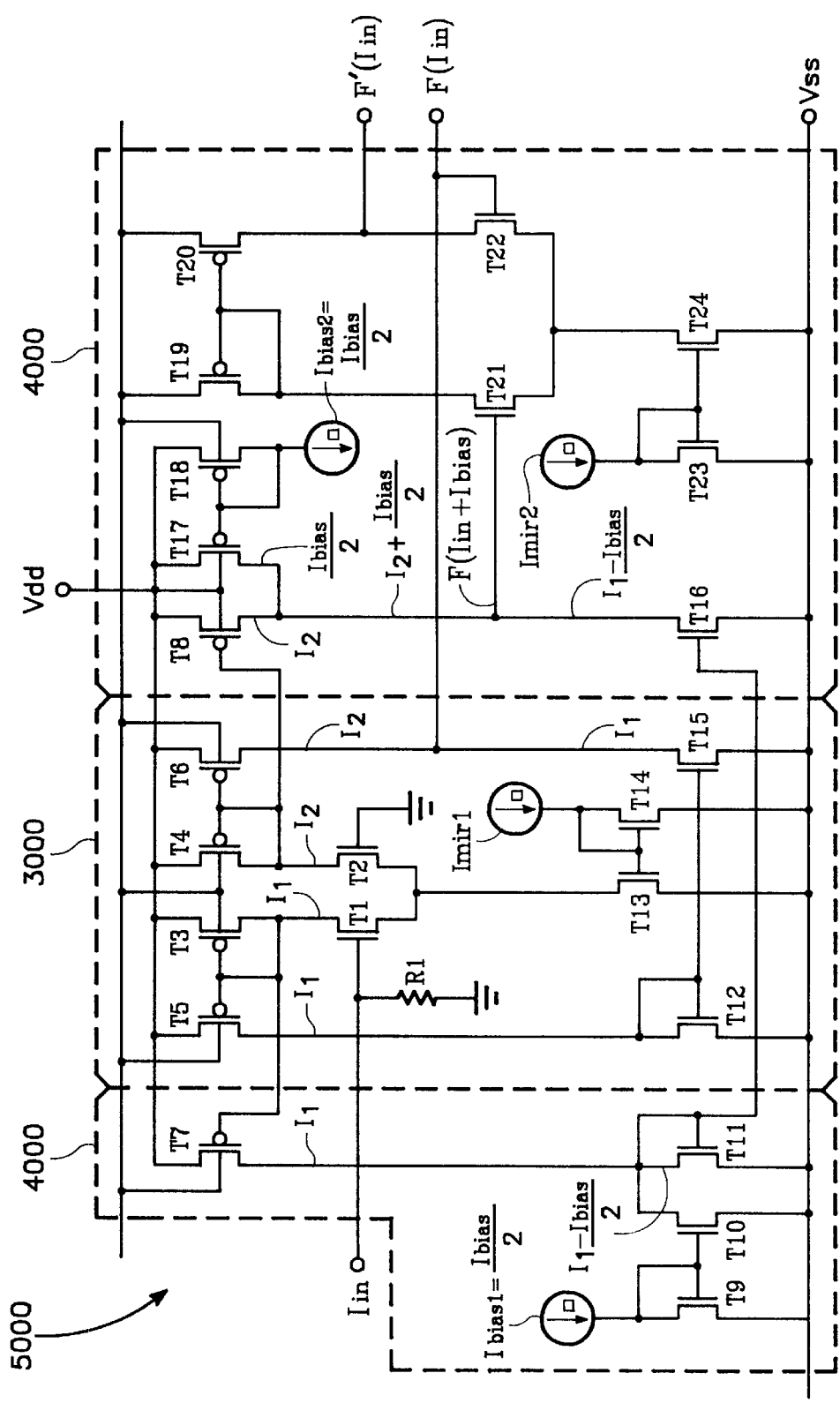
FIG. 4 is a schematic diagram of a neuron and derivative circuit in accordance with a preferred embodiment of the present invention.

Turning to FIG. 4, in a preferred embodiment, an input signal $I_{in}$ representing the sum of the weights in a layer is supplied to transfer function circuitry 3000 which generates an output signal $F(I_{in})$ in accordance with a transfer function. The transfer function output signal $F(I_{in})$ is supplied to derivative generation circuitry 4000 to provide output $F'(I_{in})$. The derivative circuit output $F'(I_{in})$ is generated by biasing the transfer function to create a transfer function signal $F(I_{in}+I_{bias})$, from which $F(I_{in})$ is subtracted to provide $F'(I_{in})$.

The amplifier embodiment of FIG. 4 uses complementary field effect transistors T1–T24 to provide output in accordance with a sigmoidal transfer function and its derivative. It is possible in other amplifier embodiments to employ other transfer functions such as a gaussian transfer function, or other transfer function known in the art.

In the preferred embodiment of FIG. 4, the neuron transfer function output $F(I_{in})$ is generated by supplying $I_{in}$ to generate currents $I_1$ and $I_2$ which when combined together provides the sigmoidal transfer function. Thus, $I_{in}$ is supplied across R1, to the gate of T1, while the gate of transistor T2 is supplied with a reference voltage to generate currents $I_1$ and $I_2$ through T1 and T2 respectively. $I_1$ is mirrored through T5, to provide a mirrored $I_1$ through T15. This is combined with a mirrored $I_2$ provided by T6, thus providing the sigmoidal transfer function output $F(I_{in})$. Hence, the transfer function circuitry 3000 is a transconductance amplifier which provides a differential pair of transistors T1 and T2 constructed to provide currents $I_1$ and $I_2$ from an input current $I_{in}$. Mirror circuits constructed using T6 and T15 to provide a combined output from the currents $I_1$ and $I_2$ in accordance with a sigmoidal transfer function.

$F(I_{in}+I_{bais})$ is generated by providing bias currents of $$\frac{I_{bias}}{2}$$

to $I_2$ and $I_1$ and combining the result. Bias current source $I_{bias2}$ provides bias current $$\frac{I_{bias}}{2},$$

which is mirrored using T17, and combined with $I_2$ provided by T8 to form $$I_2 + \frac{I_{bias}}{2}.$$

Bias current source $I_{bias1}$ provides bias current $$\frac{I_{bias}}{2},$$

which is mirrored using T10, and combined with $I_1$ provided by T7 to generate $$I_1 - \frac{I_{bias}}{2}.$$

$$I_1 - \frac{I_{bias}}{2}$$

is mirrored using T16 and combined with $$I_2 + \frac{I_{bias}}{2}$$

to form $F(I_{in}+I_{bais})$.

$F(I_{in}+I_{bais})$ and $F(I_{in})$ are supplied to a subtraction circuit formed using transistors T19–T22 to provide $F'(I_{in})$. $F(I_{in}+I_{bais})$ is supplied to the gate of T21 and $F(I_{in})$ to the gate of T22. The current generated by T21 is mirrored by T20 and combined with the current generated by T22 to provide $F'(I_{in})$. Hence, the derivative circuitry 4000 has a circuit constructed to generate a biased $I_1$ and a biased $I_2$ and to combine the biased $I_1$ and biased $I_2$ to provide an output in accordance with the transfer function.

In one embodiment, R2 is about 200 ohms, the reference voltage is ground as shown in FIG. 4, and Ibiaa is about 50 nanoamperes. Current sources $I_{mir1}$ and $I_{mir2}$ may be coupled to T13 and T24 through T14 and T23, repsectively, to provide a means to control the gain of unbiased and biased $I_1$ and $I_2$ and thus the outputs $F(I_{in})$ and $F'(I_{in})$, respectively. Embodiments of the present invention may be implemented using VLSI circuitry.

Thus, the preferred embodiment of the present invention allows generation of the derivative of the neuron transfer characteristic in real time, which may differ from neuron to neuron, even on the same VLSI chip. Providing a hardware supplied local derivative for each neuron is more reliable and robust, and avoids the issue of processing variations.

Figures 5A, 5B, 5C:
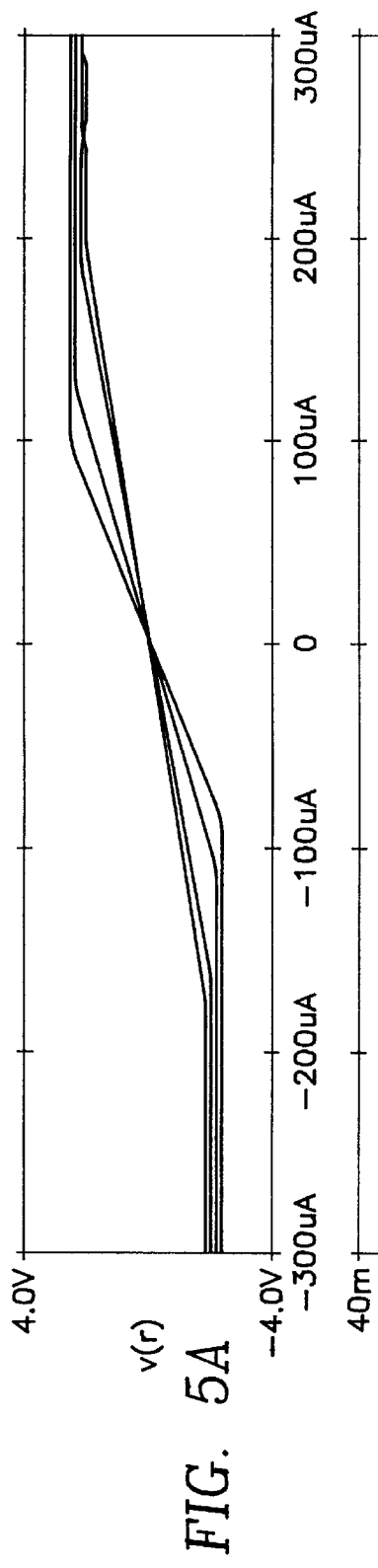
FIG. 5A is empirical data of the transfer function generated by embodiments of the present invention.
FIG. 5B shows an ideal derivative of the transfer functions of FIG. 5A with respect to the input signals.
FIG. 5C shows simulation data of the derivative of the transfer functions of FIG. 5A of the derivative circuit of FIG. 4.

FIG. 5A shows simulation data of 2 micron CMOS transistors for various sigmoidal characteristic curves. FIG. 5B shows the ideal derivative of the transfer functions of FIG. 5A with respect to the input signals. FIG. 5C shows simulation data of the derivative of the transfer functions of FIG. 5A of the derivative circuit of FIG. 4.

What I claim is:

1. A neural network circuit comprising:
   a) a training network comprising:
      (i) a plurality of analog circuits capable of charge storage;
      (ii) a plurality of analog transfer function circuits each being continuously coupled to at least one of the charge storage circuits;
      (iii) a plurality of analog derivative circuits each being continuously coupled to one of the plurality of transfer function circuits and constructed to continuously generate in real time a derivative of an output of the one transfer function circuit; and
      (iv) a weight update analog circuit for continuously updating the charge storage circuits based upon output from the plurality of transfer function circuits and output from the plurality of derivative circuits; and b) a validation network comprising:
   (i) a plurality of transfer function circuits each being coupled to the plurality of charge storage circuits so as to replicate the coupling of the plurality of charge storage-to-the plurality of transfer function circuits of the training network.

2. The neural network circuit of claim 1 wherein each of the plurality of transfer function circuits comprises a transconductance amplifier having a transfer function constructed to provide differential currents $I_1$ and $I_2$ from an input current $I_{in}$ and to combine the differential currents to provide an output in accordance with the transfer function.

3. The neural network circuit of claim 2 wherein each of the plurality of derivative circuits comprises a circuit constructed to generate a biased $I_1$ and a biased $I_2$ and to combine the biased $I_1$ and biased $I_2$ to provide an output in accordance with the transfer function.

4. The neural network circuit of claim 3 wherein each of the plurality of derivative circuits further comprises a subtraction circuit constructed to provide the derivative of the transfer function from the biasing and combining circuit and the transconductance amplifier outputs.

5. The neural network circuit of claim 4 further comprising a means to control the amplitude of $I_1$ and $I_2$.

6. The neural network circuit of claim 5 further comprising a means to control the amplitude of the biased $I_1$ and the biased $I_2$.

7. The neural network circuit of claim 1 wherein the training network is constructed to train using back propagation.

8. The neural network circuit of claim 7 further comprising a means for generating a plurality of delta weights from the plurality of derivative circuit outputs and a plurality of error signals $\epsilon$.

9. The neural network circuit of claim 7 wherein the neural network circuit is constructed to train using cascade correlation.

10. The neural network circuit of claim 1 wherein the plurality of charge storage circuits comprise capacitors.

11. The neural network circuit of claim 1 wherein the transfer function is a sigmoidal transfer function.

12. A neural network circuit comprising:
   a) a plurality of circuits capable of charge storage;
   b) a plurality of circuits each being coupled to at least one of the plurality of charge storage circuits and constructed to generate an output in accordance with a neuron transfer function;
   c) a plurality of circuits each being coupled to one of the plurality of neuron transfer function circuits and constructed to generate a derivative of the output;
   d) a weight update circuit for updating the charge storage circuits based upon output from the plurality of transfer function circuits and output from the plurality of derivative circuits; and
   wherein the neural network comprises separate training and validation networks, and wherein the training network comprises the plurality of charge storage, neuron transfer, and derivative circuits, and wherein the validation network comprises the plurality of charge storage circuits and further comprises a plurality of neuron transfer function circuits each being coupled to the plurality of charge storage circuits so as to replicate the coupling of the plurality of charge storage circuits-to-the plurality of neuron transfer function circuits.

13. The neural network circuit of claim 12 wherein each of the plurality of transfer function circuits comprises a transconductance amplifier having a transfer function constructed to provide differential currents $I_1$ and $I_2$ from an input current $I_{in}$ and to combine the differential currents to provide an output in accordance with the transfer function.

14. The neural network circuit of claim 13 wherein each of the plurality of derivative circuits comprises a circuit constructed to generate a biased $I_1$ and a biased $I_2$ and to combine the biased $I_1$ and biased $I_2$ to provide an output in accordance with the transfer function.

15. The neural network circuit of claim 14 wherein each of the plurality of derivative circuits further comprises a subtraction circuit constructed to provide the derivative of the transfer function from the bias and combine circuit and the transconductance amplifier outputs.

16. The neural network circuit of claim 12 wherein the plurality of charge storage circuits comprise capacitors.

17. The neural network circuit of claim 12 wherein the transfer function is a sigmoidal transfer function.

18. The neural network circuit of claim 12 wherein the neural network circuit is constructed to train using back propagation.

19. The neural network circuit of claim 18 wherein the neural network circuit is constructed to train using cascade correlation.

20. A method of signal processing in a neural network comprising:
   a) creating a plurality of synaptic weights by storing charge on a plurality of capacitive circuits;
   b) generating a plurality of neuron outputs in accordance with a transfer function from the plurality of weights using a plurality of transfer function analog circuits;
   c) continuously generating in real time a derivative of each of the plurality of neuron outputs using a plurality of derivative circuits each coupled to one of the plurality of transfer function circuits; and
   d) training the neural network using a plurality of delta weights generated using the plurality of transfer function derivatives.

21. The method of claim 20 wherein training further comprises controlling a learning rate of the plurality of weights using a validation network comprising a plurality of transfer functions circuits coupled to the plurality of weights.

22. The method of claim 21 wherein controlling the learning rate further comprises:
   a) supplying a cross-validation data set to the validation network;
   b) generating error signals at an output of the validation network;
   c) comparing the error signals to a threshold value; and
   d) setting the learning rate using a result of the comparison.

23. The method of claim 20 further comprising validating test set data using a validation network comprising a plurality of transfer functions circuits coupled to the plurality of weights.

24. The method of claim 23 wherein validating the test set data and training the neural network are performed simultaneously.

25. The method of claim 20 further comprising generating a second plurality of neuron outputs in accordance with the transfer function by sharing the plurality of weights and using a second plurality of transfer function circuits.

26. The method of claim 20 further comprising using a pseudo inverse technique to calculate an initial value for the plurality of weights.

27. The method of claim 20 wherein training further comprises adding a plurality of new hidden neurons to previously formed neurons based on the learning rate to generate a plurality of neuron outputs in accordance with the transfer function from a plurality of new hidden weights using a plurality of new transfer function circuits.

28. The method of claim 27 further comprising generating a derivative of each of the plurality of new hidden neuron outputs.

29. The method of claim 20 wherein generating a plurality of neuron outputs in accordance with a transfer function and generating a derivative of each of the plurality of neuron outputs further comprises using field effect transistors.

30. The method of claim 20 wherein generating a plurality of neuron outputs comprises generating differential output currents $I_1$ and $I_2$ for each of the plurality of neuron outputs, and wherein generating a derivative of each of the plurality of neuron outputs further comprises providing biases to each of $I_1$ and $I_2$, and wherein generating a derivative of each of the plurality of neuron comprises using $I_1$ and $I_2$ and the biased $I_1$ and biased $I_2$ to provide an output in accordance with the transfer function.

31. A method for signal processing in a neural network circuit comprising:
   a) training a plurality of synaptic weights by storing charge on a plurality of capacitive circuits using a training network having a plurality of neurons each capable of providing outputs in accordance with a transfer function;
   b) sharing the plurality of weights with a validating network having a second plurality of neurons each capable of providing outputs in accordance with the transfer function; and
   c) performing at least one of cross-validation testing or validation testing using the validation network.

32. The method of claim 31 wherein training and performing the at least one of cross-validation testing or the validating testing are performed simultaneously.

* * * * *